(12) United States Patent
Jurkat

(10) Patent No.: US 8,148,835 B2
(45) Date of Patent: Apr. 3, 2012

(54) METHOD FOR CONTROLLING A WIND ENERGY PLANT

(75) Inventor: Mark Jurkat, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 794 days.

(21) Appl. No.: 12/174,443

(22) Filed: Jul. 16, 2008

(65) Prior Publication Data

US 2009/0309360 A1 Dec. 17, 2009

(30) Foreign Application Priority Data

Jun. 16, 2008 (DE) .................. 10 2008 028 568

(51) Int. Cl.
F03D 9/00 (2006.01)
H02P 9/04 (2006.01)

(52) U.S. Cl. ........................... 290/44; 290/55
(58) Field of Classification Search ................ 290/44, 290/55

See application file for complete search history.

(56) References Cited

U.S. PATENT DOCUMENTS

| | | | | |
|---|---|---|---|---|
| 3,508,196 A * | 4/1970 | Brown et al. | ................. | 714/771 |
| 3,702,462 A * | 11/1972 | England | ............... | 710/1 |
| 3,810,105 A * | 5/1974 | England | ............... | 710/43 |
| 3,820,079 A * | 6/1974 | Bergh et al. | ................. | 710/112 |
| 4,493,021 A * | 1/1985 | Agrawal et al. | ............... | 709/236 |
| 4,494,113 A * | 1/1985 | Yamaoka et al. | ............. | 370/444 |
| 4,511,807 A * | 4/1985 | Somerville | ................. | 290/44 |
| 4,910,658 A * | 3/1990 | Dudash et al. | ................. | 700/9 |
| 4,922,769 A * | 5/1990 | Tury | ................. | 477/125 |
| 5,369,584 A * | 11/1994 | Kajiwara | ................. | 701/48 |
| 7,417,333 B2 * | 8/2008 | Miller et al. | ................. | 290/44 |
| 7,476,987 B2 * | 1/2009 | Chang | ................. | 290/55 |
| 7,557,457 B2 * | 7/2009 | Richter et al. | ................. | 290/44 |
| 7,638,984 B2 * | 12/2009 | Jurkat et al. | ................. | 322/35 |
| 7,649,282 B2 * | 1/2010 | Jurkat et al. | ................. | 307/84 |
| 7,663,260 B2 * | 2/2010 | Kabatzke et al. | ................. | 290/44 |
| 7,706,398 B2 * | 4/2010 | Jung et al. | ................. | 370/447 |
| 7,714,458 B2 * | 5/2010 | Harms et al. | ................. | 290/44 |
| 7,756,609 B2 * | 7/2010 | Jurkat et al. | ................. | 700/286 |
| 7,805,222 B2 * | 9/2010 | Jurkat | ................. | 700/287 |
| 7,826,988 B2 * | 11/2010 | Jurkat et al. | ................. | 702/60 |
| 7,901,258 B1 * | 3/2011 | McChesney et al. | ................. | 440/1 |
| 7,911,971 B2 * | 3/2011 | Beichter et al. | ................. | 370/252 |
| 7,949,434 B2 * | 5/2011 | Jurkat | ................. | 700/287 |
| 7,960,850 B2 * | 6/2011 | Rasmussen | ................. | 290/44 |
| 2002/0099487 A1 | 7/2002 | Suganuma et al. | ................. | 701/48 |

(Continued)

FOREIGN PATENT DOCUMENTS

DE 103 00 174 B3 12/2004

(Continued)

*Primary Examiner* — Pedro J Cuevas
(74) *Attorney, Agent, or Firm* — Vidas, Arrett & Steinkraus

(57) ABSTRACT

The present invention is related to a method for controlling a wind energy plant with plural control units, which perform control tasks in the wind energy plant, comprising the following steps:

Figure 1:
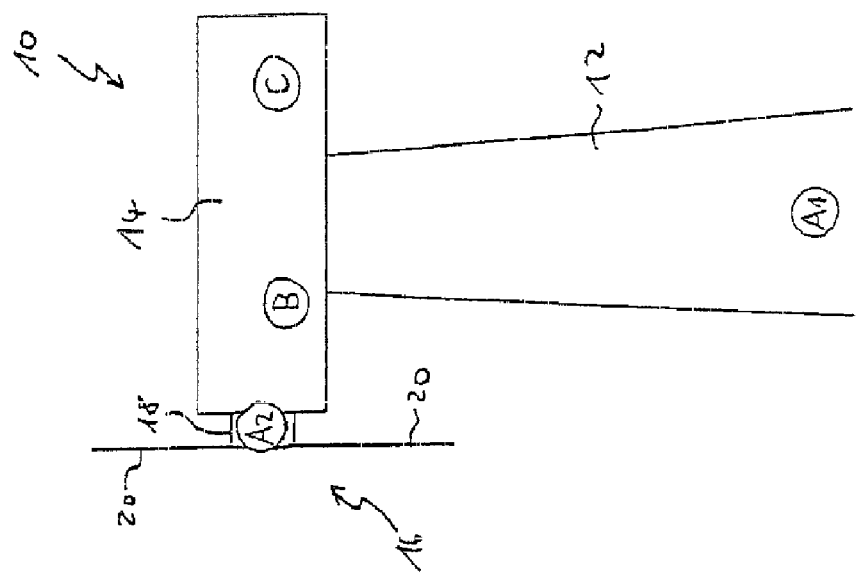

a) one priority at a time is assigned to the control units, depending on the control tasks they must perform,
b) during the operation of the wind energy plant, the control units communicate continuously with each other and/or with a central communication unit,
c) in case that there is a failure of a first control unit of the wind energy plant, a second control unit of the wind energy plant takes over the control tasks of the defective control unit, wherein the second control unit is selected depending on the priority assigned thereto and has the same as or a lower priority than the defective control unit.

17 Claims, 1 Drawing Sheet

U.S. PATENT DOCUMENTS

| | | | |
|---|---|---|---|
| 2005/0122911 A1* | 6/2005 | Beichter et al. | 370/252 |
| 2007/0223456 A1* | 9/2007 | Maruyama et al. | 370/352 |
| 2007/0229216 A1* | 10/2007 | Yasuda | 340/3.42 |
| 2007/0246943 A1* | 10/2007 | Chang et al. | 290/44 |
| 2008/0001411 A1* | 1/2008 | Ichinose et al. | 290/55 |
| 2008/0026762 A1* | 1/2008 | Lee | 455/445 |
| 2008/0030027 A1* | 2/2008 | Erdman et al. | 290/40 R |
| 2008/0048501 A1* | 2/2008 | Jurkat et al. | 307/81 |
| 2008/0106098 A1* | 5/2008 | Miller et al. | 290/44 |
| 2008/0116690 A1* | 5/2008 | Kabatzke et al. | 290/44 |
| 2008/0174180 A1* | 7/2008 | Jurkat et al. | 307/80 |
| 2009/0033096 A1* | 2/2009 | Jurkat | 290/44 |
| 2009/0160187 A1* | 6/2009 | Scholte-Wassink | 290/44 |
| 2009/0160189 A1* | 6/2009 | Rasmussen | 290/44 |
| 2009/0212566 A1* | 8/2009 | Harms et al. | 290/44 |
| 2009/0254224 A1* | 10/2009 | Rasmussen | 700/287 |
| 2009/0309361 A1* | 12/2009 | Jurkat | 290/44 |
| 2010/0191384 A1* | 7/2010 | Jurkat | 700/287 |
| 2010/0219634 A1* | 9/2010 | Gabeiras et al. | 290/44 |
| 2010/0268849 A1* | 10/2010 | Bengtson et al. | 709/248 |
| 2010/0305767 A1* | 12/2010 | Bengtson | 700/287 |
| 2010/0312410 A1* | 12/2010 | Nielsen | 700/287 |
| 2010/0333100 A1* | 12/2010 | Miyazaki et al. | 718/103 |
| 2011/0035068 A1* | 2/2011 | Jensen | 700/287 |
| 2011/0066297 A1* | 3/2011 | Saberi et al. | 700/287 |

FOREIGN PATENT DOCUMENTS

DE 60219705 T2 1/2008

* cited by examiner

METHOD FOR CONTROLLING A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for controlling a wind energy plant with plural control units, which perform control tasks in the wind energy plant. For the operation of a wind energy plant, one central or plural decentral control units can be provided. For example, decentral control units can be provided for the pitch control of the blades, a main converter control, an azimuth angle control, a cooling system control, a lubrication control and so on. Optionally, a condition monitoring system (CMS) may also be provided, which has to detect a necessary maintenance operation in good time.

From DE 103 00 174 B3, the entire contents of which is incorporated herein by reference, a wind energy plant with plural components is known, which each one possess sensors and/or actuators and feature a control device. In this, the control devices are connected to a data network. Via this data network, the control devices can exchange signals with each other, concerning operating conditions of the respective controlled components, sensor values and/or control signals for other components. Thus, a central control is omitted in the known wind energy plant. Instead, the control takes place on the basis of the individual components. In this component based control of the wind energy plant, the communication between the components takes place independently from specific parameters. An advantage of this approach is that components of different manufacturers can be exchanged without great expense.

A problem arises when there is a failure of a control unit. In such a case, according to the circumstances, the control tasks to be performed by the control unit can no more be exerted. This may affect the operation of the wind energy plant.

Departing from the clarified state of the art, the present invention is therefore based on the objective to provide a method of the kind mentioned at the beginning, in which the availability of the wind energy plant and of its components is always at hand.

BRIEF SUMMARY OF THE INVENTION

According to a first aspect of the invention, the objective is resolved by a method of the kind mentioned at the beginning, comprising the following steps:
a) one priority at a time is assigned to the control units, depending on the control tasks they must perform,
b) during the operation of the wind energy plant, the control units communicate continuously with each other and/or with a central communication unit,
c) in case that there is a failure of a first control unit of the wind energy plant, a second control unit of the wind energy plant takes over the control tasks of the defective control unit, wherein the second control unit is selected depending on the priority assigned thereto and has the same as or a lower priority than the defective control unit.

According to the present invention, the control units serve for controlling different components of the wind energy plant. For instance, it may be dealt with a pitch control of the blades, a main converter control, an azimuth angle control, a cooling system control, a lubrication control and so on. Optionally, a CMS may also be provided. The control units can be parts of control systems with input- and/or output assembly groups, which are connected to the actuators and/or sensors required for the respective system. Each system can have one or plural control units. As a matter of course, the control units can in principle also perform a closed loop control, besides to a simple control.

According to the first aspect of the invention, different priorities are assigned to the control units. The priorities are awarded depending on the importance of the respective control unit for the operation of the wind energy plant. Thus, a CMS is not necessarily required for the operation of the wind energy plant. In case of a failure of control unit which is more important for the operation of the wind energy plant, the control unit of the CMS can take over the tasks of the defective control unit. Thus, it is ensured that in the frame of the available control capacity, the most important control tasks of the wind energy plant are performed any time. In this, the control units are in continuous communication, in a cyclic manner in regular intervals, for instance. By doing so, they can write data into decentral memories (flash memories) of the other control units, or notify them to a central communication unit. In the frame of the communication, the control units transmit their respective status, for instance. However, they may also transmit measurement- and control data, settings and so on. The central communication unit may be a master control with one or plural master servers. By the communication, the controls retrieve the availability of the other control units, from the communication unit or directly from the other control units, and thus when there is a failure, they can reconfigurate themselves or controlled by the communication unit, in order to take over control tasks of another control unit. In the present context, there is a failure of a control unit (a blackout for instance) when the same does no more participate in the communication.

In this, the control unit which takes over the control tasks of the defective control unit has the same as or a lower priority than the defective control unit. Through this, for instance, in the case that the control unit which takes over the control tasks of the defective control unit can no more perform its own control tasks thereafter, there is no breakdown of control tasks which are more important than those of the defective control unit. When the control unit taking over the control tasks of the defective control unit has a lower priority, only control tasks break down which are less important for the operation of the wind energy plant. Thus, in the frame of the available control capacity, it is ensured that the most important control tasks of the wind energy plant can always be performed. It may be advantageous that the control unit taking over the control tasks of the defective control unit has the lowest priority which can be awarded. In this case, when plural control units break down, only a minimal change of the assignment of control tasks is necessary.

The selection of the control unit "replacing" the defective control unit can take place automatically, for instance, this may be performed by the central communication unit, or it may take place due to a preset order. However, the selection can also take place manually by an operator. The central communication unit can possess prioritization rules for the distribution of the control tasks.

As soon as the defective control unit is ready for function again, it takes over its tasks again, and the control unit which had temporarily taken over its tasks before performs its own tasks again, or control tasks of another control unit which is broken down. Thus, a successive beginning again of control tasks according to priority may take place.

The method of the present invention increases the availability of control systems in a wind energy plant by an intelligent, redundant task distribution. In this, important defective single system controls can be replaced temporarily, let it be through reserve controls or even by subsystems, so that it is always ensured that important tasks are performed. The method is therefore particularly suitable for difficultly accessible wind energy plants, offshore wind energy plants for instance.

Preferably, the communication between the controls and with the central communication unit takes place via a bus technology. For instance, the same can be operated via wireless, light wave guide or even electrically, with different protocol techniques, like Ethernet, Profinet, Ethercat and so on. In this, the required protocol medium can be available for each control unit in a wind energy plant network. The corresponding hardware has then to be dimensioned for the used protocol/bus-systems.

According to one embodiment, the second control unit can have performed own control tasks before taking over the control tasks of the defective control unit. After taking over the control tasks of the defective control unit, it is possible that the second control unit continues to perform its own control tasks it had performed before. Thus, in this case the control unit can perform plural tasks at the same time, two or more for instance. No breakdown of control activities takes place in this case. But it is also possible that after taking over the control tasks of the defective control unit, the second control unit does no more perform its own control tasks it had performed before. In this case, it is conceivable that a third control unit of the wind energy plant takes over the control tasks of the second control unit. The third control unit can take over the control tasks of the second control unit in addition to its own tasks, or instead of own tasks. In every case, the availability of the wind energy plant control can be increased further by the successive redistribution of the control tasks. In particular, when the third control unit performs the control tasks of the second control unit instead of its own tasks, the third control unit can be selected in turn, depending on the priority assigned to it, and it may have the same as or a lower priority than the second control unit. Then, it is granted again that only control tasks break down which are less important for the wind energy plant.

The second control unit may also be a replacement control unit, which did not perform own control tasks before taking over the control tasks of the defective control unit. Thus, a reserve control unit is kept at hand, which serves only for taking over the tasks of defective control units. Then, it is ensured that in the case of a failure of a control unit, no breakdown of control tasks of the wind energy plant occurs.

In order to ensure that at further breakdowns of control units, a control unit which has already stepped into the breach for a control unit with higher priority is not used for taking over further, possibly less prioritized control tasks and thus can possibly no more perform its higher prioritized control tasks of the control unit first broken down, the higher priority of the other control unit can be assigned to a control unit after taking over the control tasks of the other control unit with higher priority, for so long as it performs the control tasks of the second control unit.

According to a second aspect of the present invention, the objective is resolved by a method of the previously mentioned kind, comprising the following steps:

a) during the operation of the wind energy plant, the control units communicate continuously with each other and/or with a central communication unit, b) in case that there is a failure of a first control unit of the wind energy plant, a second control unit of the wind energy plant, which has performed its own control tasks before, takes over the control tasks of the defective control unit, wherein the second control unit is selected depending on whether it has sufficient capacity for performing the control tasks of the defective control unit in addition to its owns control tasks, and the second control unit performs its own control tasks as well as the control tasks of the defective control unit subsequently.

With respect to the second aspect of the present invention, what was said for the first aspect of the present invention applies in an analogous way. However, in difference to the first aspect of the present invention, no prioritization of the control units has to take place, (but as a matter of course, priorities can be assigned to the control units also, as in the first aspect of the invention). In this aspect of the invention, the selection of the control unit taking over the control tasks of the defective control unit takes place depending on whether the same has a sufficient capacity for performing its own control tasks as well as the control tasks of the defective control unit. In so far as a prioritization of the control units takes place anyway, the control unit which takes over the tasks of the defective control unit may even have a higher priority than the defective control unit. Thus, it is granted in this aspect of the invention that even at a breakdown of a control unit, all the control tasks of the wind energy plant can still be performed.

According to a further embodiment of the present invention, at least one control unit can have at least one control program for performing the control tasks of at least one other control unit of the wind energy plant. In principle, some control units of the wind energy plant can have the same control program, which has only other parameters. In contrast, other control units may have different control programs. In order to ensure that in case of a failure of a control unit, another control unit having possibly a different program can replace the defective control unit anyway, the control program of the defective control unit has to be provided to the "replacing" control unit. In this, the task field, the program, addresses of sensors/actuators as well as operational parameters are memorized once and/or cyclically, manually and/or automatically, centrally and/or decentrally in particular. In this embodiment of the present invention, all or certain control programs of other control units can be kept at hand in each control unit, those of one or plural control units with higher priority in particular, in addition to the respective own control program.

Alternatively, it is possible that the control units retrieve a control program for performing the control tasks of another control unit from a central communication unit according to necessity, before taking over the control tasks of the other control unit. Also, they may retrieve the program from another control unit, a central wind energy plant control unit for instance.

When the control units communicate with a central communication unit, the latter can perform the assignment of the control tasks to the control units in the case of a failure of a control unit. The central communication unit can be formed by the central wind energy plant control unit. But it may also form a control unit which is separate from the control units. The communication unit takes over the distribution of the control tasks to the control units, in particular also the decision which control unit must take over the tasks of the defective control unit in the case of a failure. For this purpose it can have prioritization rules, a prioritization table for instance. For the further development of the redundancy, even the central communication unit can be provided to be multiplicate, and thus to be redundant.

According to an alternative embodiment, the control units can communicate with each other and the assignment of the control tasks to the control units in case of a failure of a control unit can take place automatically, according to an order which was preset before. Thus, in this embodiment no communication via a central communication unit has to take place. Instead, there is an automatic co-ordination of the tasks, wherein the control units decide themselves about the task distribution. For this purpose, a suitable order of the control units can be preset before.

Both aspects of the present invention with all their embodiments can also be combined with each other, of course.

BRIEF DESCRIPTION OF THE VIEWS OF THE INVENTION

One example of the realization of the present invention is explained in more detail by means of figures in the following.

Figure 2:
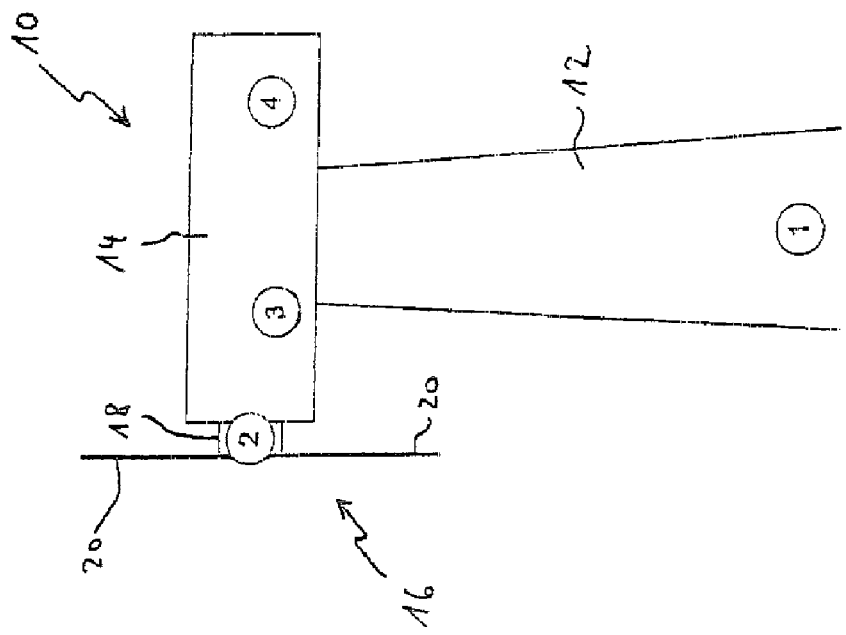

FIG. 1 shows a schematic representation of a wind energy plant with plural control units, and FIG. 2 shows a further schematic representation of the wind energy plant from FIG. 1.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated As far as not indicated otherwise, equal reference signs denote equal objects in the figures. In FIG. 1, a wind energy plant 10 is shown. In a known manner, it has a tower 12, on which a nacelle 14 is rotatably mounted around the longitudinal axis of the tower 12. The nacelle 14 carries a rotor 16 with a rotor hub 18 and rotor blades 20, three rotor blades 20 in the present case.

In FIG. 1, plural control units of the wind energy plant 10 are schematically depicted. At the tower foot, there is a control unit 1 for controlling the main converter. In the region of the rotor hub 18, there is a control unit 2 for controlling the blade pitch of the rotor blades (pitch control). Also depicted is a control unit 3 for controlling the lubricant provisioning of an azimuth drive for rotating the nacelle 14 on the tower 12. Finally, a control unit 4 of a condition monitoring system (CMS) is shown. The control units 1, 2, 3, 4 perform different control tasks, whose importance for the operation of the wind energy plant is different. The main converter control by the control unit 1 is a very important control in particular, because the whole wind energy plant 10 cannot be operated without it. Equally important is the control task of the control unit 2 for adjusting the blade pitch angle. When the same breaks down, the adjustment angles of the rotor blades 20 can no more be adjusted, and a safe operation of the plant 10 is no more guaranteed. In contrary, the control unit 3 for the azimuth lubrication is less important, because when the same breaks down, the wind energy plant 10 can still be operated, at least for a certain time. The condition monitoring system with the control unit 4 is least important for the operation of the wind energy plant, because it serves only for the early recognition of maintenance operations.

Accordingly, priorities according to the importance of their control tasks for the operation of the wind energy plant are assigned to the control units 1, 2, 3, 4. This is schematically depicted in FIG. 2. Thus, the control units 1 or 2, respectively, receive the highest and equally high priorities A1 and A2, respectively. The control unit 3 receives a lower priority B and the control unit 4 the lowest priority C.

The following Table illustrates the method of the present invention:

| Order in time | Controls 1 | 2 | 3 | 4 | Task/program which is not executable | Event |
|---|---|---|---|---|---|---|
| 1 | A1 | A2 | B | C | — | |
| 2 | X | A2 | B | A1 | C | Control 1: breakdown Control 4: take over task with priority A1, do not take task C into account |
| 3 | X | X | A2 | A1 | B, C | Control 2: breakdown Control 3: take over task with priority A2 when lubrication is not necessarily required |
| 4 | A1 | X | B | A2 | C | Control 1: available again Control 3: takes over the original task with priority B Control 4: takes over task with priority A2 |
| 5 | A1 | A2 | B | C | — | Control 2: available again Control 2: takes over the original task with priority A2 Control 4: takes over the original task with priority C |

In this, an order in time of different events 1 to 5 is shown in the first column, wherein the smallest number represents the first event in time and the last number the last event in time. In the further columns 2 to 5, the different controls 1, 2, 3 and 4 of the wind energy plant 10 are listed. At the different points in time 1 to 5, the control tasks of different priorities A1, A2 B and C, performed respectively by the control units 1 to 4 are represented in the columns 2 to 5 of the table. An X in a table cell indicates that the control unit provided in the associated column can no more exert its task due to a failure. In the next column are listed such control tasks or control programs, respectively, which at certain points in time or upon certain events, as listed in the last column, can no more be performed by any control unit.

During the operation of the wind energy plant, the control units 1, 2, 3, 4 communicate continuously with each other, and/or with a central communication unit (not shown). In the shown example, the communication takes place cyclically, in intervals of a few seconds, for instance. In the frame of the communication, the control units transmit their respective conditions, for instance. In this way, the control units 1, 2, 3, 4 are always informed about the operability of the other control units 1, 2, 3, 4. In case that there is a failure of a control unit 1, 2, 3, 4, this is detected by the other control units 1, 2, 3, 4 or by the central communication unit, and accordingly, the control tasks of the defective control unit can be transferred to other control units 1, 2, 3, 4.

The decision about the coordination of the control tasks can take place either by a human operator, or it may be performed automatically by a central communication unit, for instance, through preset priority patterns or auto-adaptive optimization functions. In case that the replacing control unit downloads the control program of the defective control unit into its memory alternatively or in addition to its own program, it receives furthermore the necessary last settings of the defective control unit, like the parameter set as well as possible addresses of sensors and actuators, and then it can start the control program of the defective control unit. When the control unit 1 breaks down at the point in time 2, the control unit 4 with the lowest priority takes over the control tasks of the control unit 1 with priority A1. Accordingly, the control tasks with priority C can no more be performed. When the control unit 2 breaks down also in the following (point in time 3), the control unit 3 with the lower priority B takes over the control tasks of the control unit 2 with priority A2. Accordingly, the control tasks with the priorities B and C can no more be performed. In case that the control unit 4 is available again at the point in time 4, it takes over its control tasks with priority A1 again. Accordingly, the control unit 3 can take over its control tasks with priority B again, and the control unit with the lowest priority (control unit 4) takes over the defective control tasks with the next higher priority. In the point of time 5, all control units 1, 2, 3, 4 are available again, so that all control tasks are performed regularly.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for controlling a wind energy plant with plural control units which perform control tasks in the wind energy plant, comprising the following steps:
    a) one priority at a time is assigned to the plural control units, depending on the control tasks they must perform,
    b) during the operation of the wind energy plant, the plural control units communicate continuously with each other and with a central communication unit,
    c) in case that there is a failure of a first control unit of the plural control units of the wind energy plant, a second control unit of the plural control units of the wind energy plant takes over the control tasks of the defective first control unit, wherein the second control unit is selected depending on the priority assigned thereto and has the same as or a lower priority than the defective control unit.

2. A method according to claim 1, characterised in that the second control unit has performed its own control tasks before taking over the control tasks of the defective control unit.

3. A method according to claim 2, characterised in that after taking over the control tasks of the defective first control unit, the second control unit continues to perform its own control tasks which it had performed before.

4. A method according to claim 2, characterised in that after taking over the control tasks of the defective first control unit, the second control unit does not perform its own control tasks which it had performed before.

5. A method according to claim 4, characterised in that a third control unit of the plural control units of the wind energy plant takes over the control tasks of the second control unit.

6. A method according to claim 5, characterised in that the third control unit is selected depending on the priority assigned thereto and has the same as or a lower priority than the second control unit.

7. A method according to claim 1, characterised in that the second control unit is a replacement control unit, which did not perform any own control tasks before taking over the control tasks of the defective control unit.

8. A method according to claim 1, characterised in that after taking over the control tasks of one of the plural control units which has a higher priority, the higher priority of the control unit is assigned to another of the plural control units.

9. A method according to claim 1, characterised by the further procedural step that in case that a failure of the first control unit of the wind energy plant takes place, the second control unit of the wind energy plant, which has performed its own control tasks before, takes over the control tasks of the defective first control unit, wherein the second control unit is selected depending on whether it has sufficient capacity for performing the control tasks of the defective first control unit in addition to its owns control tasks, and subsequently, the second control unit performs its own control tasks as well as the control tasks of the defective first control unit.

10. A method according to claim 9, characterised in that at least one control unit has at least one control program for performing the control tasks of at least one other control unit of the wind energy plant.

11. A method for controlling a wind energy plant with plural control units which perform control tasks in the wind energy plant, comprising the following steps:
    a) during the operation of the wind energy plant, the plural control units communicate continuously with each other and with a central communication unit,
    b) in case that a failure of a first control unit of the plural control units of the wind energy plant takes place, a second control unit of the plural control units of the wind energy plant, which has performed its own control tasks before, takes over the control tasks of the defective first control unit, wherein the second control unit is selected depending on whether it has sufficient capacity for performing the control tasks of the defective first control unit in addition to its owns control tasks, and subsequently, the second control unit performs its own control tasks as well as the control tasks of the defective first control unit.

12. A method according to claim 11, characterised in that at least one control unit has at least one control program for performing the control tasks of at least one other control unit of the wind energy plant.

13. A method according to claim 11, characterised in that the control units retrieves a control program for performing the control tasks of another control unit from a central communication unit according to necessity, before taking over the control tasks of the other control unit.

14. A method according to claim 11, characterised in that the control units communicate with a central communication unit and that the central communication unit performs the assignment of the control tasks to the control units in case of a failure of a control unit.

15. A method according to claim 11, characterised in that the control units communicate with each other and that the assignment of the control tasks to the control units in case of a failure of a control unit takes place automatically, according to an order which was preset before.

16. A method for controlling a wind energy plant with plural control units which perform control tasks in the wind energy plant, comprising the following steps:
   a) one priority at a time is assigned to the plural control units, depending on the control tasks they must perform,
   b) during the operation of the wind energy plant, the plural control units communicate continuously with each other and with a central communication unit,
   c) in case that there is a failure of a first control unit of the plural control units of the wind energy plant, a second control unit of the plural control units of the wind energy plant takes over the control tasks of the defective first control unit, wherein the second control unit is selected depending on the priority assigned thereto and has the same as or a lower priority than the defective control unit, and
   further characterised in that the control units retrieves a control program for performing the control tasks of another control unit from a central communication unit according to necessity, before taking over the control tasks of the other control unit.

17. A method for controlling a wind energy plant with plural wind energy plants and plural control units which perform control tasks in the wind energy plant, comprising the following steps:
   a) during the operation of the wind energy plant, the plural control units communicate continuously with each other and with a central communication unit,
   b) in case that a failure of a first control unit of the plural control units of the wind energy plant takes place, a second control unit of the plural control units of the wind energy plant, which has performed its own control tasks before, takes over the control tasks of the defective first control unit, wherein the second control unit is selected depending on whether it has sufficient capacity for performing the control tasks of the defective first control unit in addition to its owns control tasks, and subsequently, the second control unit performs its own control tasks as well as the control tasks of the defective first control unit, and
   further characterised in that the control units retrieves a control program for performing the control tasks of another control unit from a central communication unit according to necessity, before taking over the control tasks of the other control unit.

* * * * *